(12) United States Patent
Simon et al.

(10) Patent No.: US 7,514,526 B2
(45) Date of Patent: Apr. 7, 2009

(54) PROCESS FOR PREPARING A STABILIZED POLYESTER

(75) Inventors: Dirk Simon, Mutterstadt (DE); Dario Lazzari, Bologna (IT); Stephen Mark Andrews, New Fairfield, CT (US); Heinz Herbst, Lörrach (DE)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 22 days.

(21) Appl. No.: 11/348,664

(22) Filed: Feb. 7, 2006

(65) Prior Publication Data

US 2006/0155065 A1 Jul. 13, 2006

Related U.S. Application Data

(63) Continuation of application No. 10/472,789, filed on Sep. 24, 2003, now Pat. No. 7,205,379.

(30) Foreign Application Priority Data

Mar. 28, 2001 (EP) ................... 01810316

(51) Int. Cl.
| | |
|---|---|
| C08G 63/02 | (2006.01) |
| C08G 63/16 | (2006.01) |
| C08G 63/18 | (2006.01) |
| C08G 63/44 | (2006.01) |
| C08G 63/68 | (2006.01) |
| C08G 69/00 | (2006.01) |
| C08G 18/42 | (2006.01) |
| C08G 18/48 | (2006.01) |

(52) U.S. Cl. .................. 528/286; 528/287; 528/288; 528/298; 528/302; 528/307; 528/308; 528/308.6; 524/706; 524/710; 524/713; 524/755; 524/765; 524/766; 428/35.2; 428/35.7; 428/36.9

(58) Field of Classification Search ............ 528/286, 528/287, 288, 298, 302, 307, 308, 308.6; 524/706, 710, 713, 714, 755, 765, 766; 428/35.2, 428/35.7, 36.9

See application file for complete search history.

(56) References Cited

U.S. PATENT DOCUMENTS

| | | | | |
|---|---|---|---|---|
| 2,996,475 | A | 8/1961 | Joyner et al. | 260/45.4 |
| 3,577,381 | A | 5/1971 | Stewart et al. | 260/45.7 |
| 3,742,096 | A | 6/1973 | Spivack | 558/177 |
| 3,901,848 | A | 8/1975 | Dibattista et al. | 524/91 |
| 4,013,624 | A | 3/1977 | Hoeschele | 260/75 |
| 4,185,003 | A | 1/1980 | Hoeschele | 260/45.8 |
| 4,525,504 | A * | 6/1985 | Morris et al. | 524/99 |
| 5,235,027 | A | 8/1993 | Thiele et al. | 528/308.2 |
| 5,461,151 | A * | 10/1995 | Waterman | 544/216 |
| 5,864,005 | A | 1/1999 | Kim et al. | 528/176 |
| 5,898,058 | A | 4/1999 | Nichols et al. | 528/286 |
| 5,939,516 | A | 8/1999 | Greaves et al. | 528/302 |
| 5,965,261 | A | 10/1999 | Webster | 428/364 |
| 5,977,221 | A * | 11/1999 | Gugumus | 524/100 |
| 6,129,209 | A | 10/2000 | Tchira | 206/423 |
| 6,136,900 | A * | 10/2000 | Kuhn et al. | 524/99 |
| 6,740,694 | B2 * | 5/2004 | Thibaut et al. | 524/94 |
| 2003/0139497 | A1 | 7/2003 | Odorisio et al. | 524/86 |

FOREIGN PATENT DOCUMENTS

| | | |
|---|---|---|
| EP | 1239006 | 9/2002 |
| WO | 00/66659 | 11/2000 |
| WO | 00/73379 | 12/2000 |
| WO | 01/00724 | 1/2001 |
| WO | 01/02489 | 1/2001 |
| WO | 01/23475 | 4/2001 |
| WO | 02/053643 | 7/2002 |

OTHER PUBLICATIONS

Derwent Abstr. 1985-035365 [06] for JP 59230022 (May 1985).

* cited by examiner

Primary Examiner—Nathan M Nutter
(74) Attorney, Agent, or Firm—Tyler A. Stevenson

(57) ABSTRACT

The present invention discloses a process for the preparation of a stabilized polyester that is low in the generation of aldehydes which comprises reacting one or more diacids with one or more diols in an esterification process, and/or one or more diesters with one or more diols in a transesterification process in the presence of an effective amount of a stabilizer selected from the group consisting of (a) a polyhydric alcohol which is for example poly(ethylene-co-vinyl alcohol), poly(styrene-co-allyl alcohol), maltitol, isomalt, sorbitol, xylitol, sucrose, mucic acid dibutylester, mucic acid di(phenyl-1-ethyl)ester, pentaerythritol or dipentaerythritol; (b) a compound of the formula II

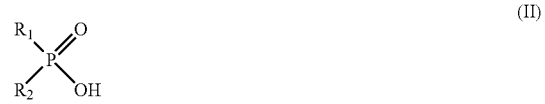

(II)

which is for example di-iso-octyl-phosphinic acid; (c) a sterically hindered amine which is for example Tinuvin 123 or Tinuvin 622; (d) a polyacrylamide, an anionic acrylic polymer or a cationic acrylamide copolymer; or (e) a hydroxylamine and/or a nitrone. Such polyesters, for example PET, when extrusion compounded exhibit a lower residual acetaldehyde content than does PET alone when similarly treated. The invention pertains to any polyester used in the manufacture of bottles or containers which in turn are used to store consumer materials, especially food, pharmaceuticals, beverages and most especially water.

11 Claims, No Drawings

PROCESS FOR PREPARING A STABILIZED POLYESTER

This is a continuation of application Ser. No. 10/472,789 filed on Sept. 24, 2003, now U.S. Pat. No. 7,205,379, which is a national stage application of PCT/EP02/03006, filed Mar. 19, 2002, the contents of which are hereby incorporated by reference.

The present invention discloses a process for the preparation of a stabilized polyester that is low in the generation of aldehydes which comprises reacting one or more diacids with one or more diols in an esterification process, and/or one or more diesters with one or more diols in a transesterification process in the presence of an effective amount of a stabilizer selected from the group consisting of (a) a polyhydric alcohol; (b) a phosphinic acid; (c) a sterically hindered amine; or (d) a polyacrylamide. Such polyesters, for example PET, when extrusion compounded exhibit a lower residual acetaldehyde content than does PET alone when similarly treated. The invention pertains to any polyester used in the manufacture of bottles or containers which in turn are used to store consumer materials, especially food, pharmaceuticals, beverages and most especially water.

A low amount of contaminants (e.g. aldehydes) in polyester water bottles is beneficial for improved taste or flavor in bottled water or other bottled beverages in said containers. The reduction in the amount of acetaldehyde in polyethylene terephthalate (PET) is highly beneficial in this respect. Acetaldehyde is known as a decomposition product of polyesters such as PET. The acetaldehyde imparts an undesirable taste or flavor to bottled water stored in polyethylene terephthalate bottles. It has been a long sought objective of the industry to reduce the level of acetaldehyde which migrates out of the PET bottle walls into the water or other beverage stored therein. A number of engineering or design changes to extruders, injection molding machines for preforms and bottle making machinery have been made to minimize formation of acetaldehyde when PET is processed. Modification to the PET composition itself have been made to lower its melting point or its melt viscosity in order to allow less severe thermal or mechanical damage when PET is processed into preforms or bottles.

U.S. Pat. No. 5,235,027 teaches the preparation of a modified copolyethylene terephthalate for processing by extrusion blow molding with a low acetaldehyde content in the presence of a tri- or tetrahydroxyalkane.

WO-A-00/73379 discloses a process for preparing a stabilized polyester that is low in the generation of aldehydes by reacting one or more diacids with one or more diols in an esterification process, and/or one or more diesters with one or more diols in a transesterification process, and adding a phosphorus-containing stabilizer to a polyester between the end of the melt phase and prior to subsequent secondary melting of the polyester in processing to the final article such as a bottle, characterized in that the stabilizer comprises one or more tri(phenyl) phosphites, wherein each phenyl group independently contains at least one substituted ortho position and, optionally mixed with one or more phenolic antioxidants.

These known processes for preparing polyesters do not satisfy in every respect the high requirements which a polyester is required to meet, especially with regard to aldehyde content of the polyester after extrusion to an end-use article like a bottle for mineral water, color properties and transparency. As a result there continues to be a need for an improved process for the preparation of polyesters.

The instant invention pertains therefore to a a process for the preparation of a stabilized polyester that is low in the generation of aldehydes which comprises reacting one or more diacids with one or more diols in an esterification process, and/or one or more diesters with one or more diols in a transesterification process in the presence of an effective amount of a stabilizer selected from the group consisting of a) a polyhydric alcohol of the formula I $$E\text{-}(OH)_n \qquad (I)$$

wherein n is 3 to 4000, and

E is an aliphatic, cycloaliphatic, aromatic or a mono-, di- or poly-sucrose moiety; with the proviso that, if n is 3 or 4 and E is an aliphatic moiety, then additionally at least one sterically hindered hydroxyphenylalkylphosphonic ester or monoester is present;

b) a compound of the formula II

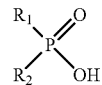

(II)

wherein $R_1$ is hydrogen, $C_1$-$C_{20}$alkyl, phenyl or $C_1$-$C_4$alkyl substituted phenyl; biphenyl, naphthyl, —$CH_2$—O—$C_1$-$C_{20}$alkyl or —$CH_2$—S—$C_1$-$C_{20}$alkyl, $R_2$ is $C_1$-$C_{20}$alkyl, phenyl or $C_1$-$C_4$alkyl substituted phenyl; biphenyl, naphthyl, —$CH_2$—O—$C_1$-$C_{20}$alkyl or —$CH_2$—S—$C_1$-$C_{20}$alkyl, or $R_1$ and $R_2$ together are a radical of the formula III

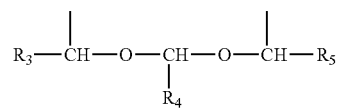

(III)

wherein $R_3$, $R_4$ and $R_5$ independently of each other are $C_1$-$C_{20}$alkyl, phenyl or $C_1$-$C_4$alkyl substituted phenyl, c) a sterically hindered amine which comprises at least a radical of the formula IV or V

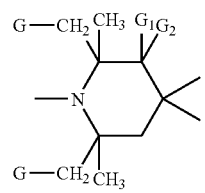

(IV)

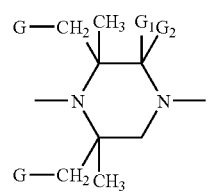

(V)

wherein

G is hydrogen or methyl, and $G_1$ and $G_2$ are hydrogen, methyl or together are oxygen, d) a polyacrylamide of the formula VI

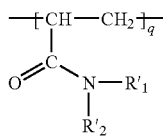
(VI)

wherein
R'$_1$ and R'$_2$ are independently of each other hydrogen, C$_1$-C$_{20}$alkyl, phenyl or C$_1$-C$_4$-alkyl substituted phenyl; biphenyl, naphthyl, —CH$_2$—O—C$_1$-C$_{20}$alkyl or —CH$_2$—S—C$_1$-C$_{20}$alkyl;

or R'$_1$ and R'$_2$ together are a radical of the formula III

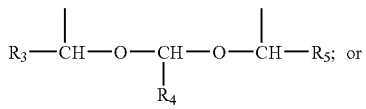
(III)

R'$_1$ and R'$_2$ together with the nitrogen atom to which they are attached form an unsubstituted or C$_1$-C$_4$alkyl substituted imidazolyl, pyrrolyl, pyrrolidonyl, piperidinyl or piperazinyl ring; and q is 5 to 300000; or a polyacrylamide copolymer wherein the comonomer is an acrylic acid, an acrylic acid salt or an acrylic ester; or e) hydroxylamines and/or nitrones.

Of interest is a process comprising components (a), (b), (c) or (d) with the proviso that the comonomer in component (d) is acrylic acid or an acrylic ester.

Also of interest is a process comprising in addition to components (a), (b), (c), (d) or (e) at least one sterically hindered hydroxyphenylalkylphosphonic ester or monoester [component (f)].

Of special interest is a process comprising all components (a), (b), (c), (d), (e) and (f) in any combination, for example (a) (b); (a) (c); (a) (d); (a) (e); (a) (f); (b) (c); (b) (d); (b) (e); (b) (f); (c) (d); (c) (e); (c) (f); (d) (e); (d) (f); (a) (b) (c); (a) (b) (d); (a) (b) (e); (a) (b) (f); (b) (c) (d); (b) (c) (e); (b) (c) (f); (c) (d) (e); (c) (d) (f); (a) (d) (e); (b) (d) (e); (c) (d) (e); (a) (c) (d); (a) (c) (e); (a) (b) (c) (d); (a) (b) (c) (e); (b) (c) (d) (e); (a) (c) (d) (e) or (a) (b) (c) (d) (e).

Components (a), (b), (c), (d) or (e) and optionally the stericlly hindered hydroxyphenylalkylphosphonic ester or monoester are used for example in an amount of 0.005 to 1% by total weight of the reactants, preferably in an amount of 0.01 to 0.30% by total weight of the reactants.

A preferred sterically hindered hydroxyphenylalkylphosphonic ester or monoester is a compound of the formula VII

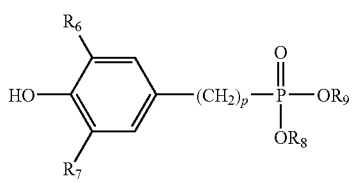
(VII)

wherein
R$_6$ is isopropyl, tert-butyl, cyclohexyl or cyclohexyl which is substituted by 1-3 C$_1$-C$_4$alkyl groups, R$_7$ is hydrogen, C$_1$-C$_4$alkyl, cyclohexyl or cyclohexyl which is substituted by 1-3 C$_1$-C$_4$alkyl groups, R$_8$ is C$_1$-C$_{20}$alkyl, unsubstituted or C$_1$-C$_4$alkyl-substituted phenyl or naphthyl, R$_9$ is hydrogen, C$_1$-C$_{20}$alkyl, unsubstituted or C$_1$-C$_4$alkyl-substituted phenyl or naphthyl; or is $$\frac{M^{r+}}{r};$$

M$^{r+}$ is an r-valent metal cation,
p is 1, 2, 3, 4, 5 or 6, and
r is 1, 2 or 3.

C$_1$-C$_{20}$alkyl substituents are radicals such as methyl, ethyl, propyl, butyl, pentyl, hexyl, octyl, stearyl or corresponding branched isomers; C$_2$-C$_4$alkyl radicals are preferred.

C$_1$-C$_4$alkyl substituted phenyl or naphthyl, which preferably contains 1 to 3, in particular 1 or 2, alkyl groups, is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butylnaphthyl.

C$_1$-C$_4$alkyl substituted cyclohexyl, which preferably contains 1 to 3, in particular 1 or 2, branched or unbranched alkyl radicals, is, for example, methylcyclohexyl, dimethylcyclohexyl, trimethylcyclohexyl or tert-butylcyclohexyl.

A monovalent, divalent or trivalent metal cation is preferably an alkali metal cation, alkaline earth metal cation, heavy metal cation or aluminium cation, for example Na$^+$, K$^+$, Mg$^{++}$, Ca$^{++}$, Ba$^{++}$, Zn$^{++}$ or Al$^{+++}$. Particular preference is given to Ca$^{++}$.

Preferred compounds of the formula VII are those which contain at least one tert-butyl group as R$_6$ or R$_7$. Very particular preference is given to compounds of the formula VII in which R$_6$ and R$_7$ are simultaneously tert-butyl.

p is preferably 1 or 2, very particularly preferably 1.

Very particularly preferred sterically hindered hydroxyphenylalkylphosphonic ester or monoester are the compounds of the formula P1 and P2.

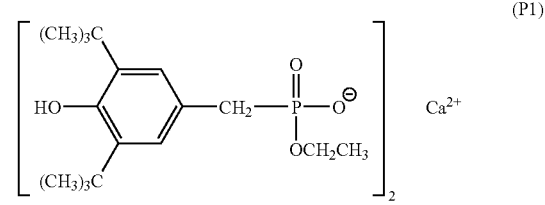
(P1)

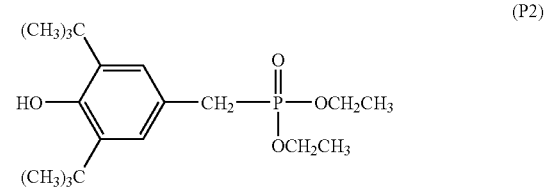
(P2)

The compound of the formula P1 is commercially available as Irganox 1425 (RTM) and that of the formula P2 is commercially available as Irganox 1222 (RTM) both from Ciba Specialty Chemicals Inc.

Preferred diacids are selected from the group consisting of aromatic dicarboxylic acids having 8 to 14 carbon atoms, aliphatic dicarboxylic acids having 4 to 12 carbon atoms, cycloaliphatic dicarboxylic acids having 8 to 12 carbon atoms, and mixtures thereof.

Preferably such diacids are terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, glutaric acid, adipic acid, sebacic acid and mixtures thereof.

Especially preferred are terephthalic acid and 2,6-naphthalene dicarboxylic acid.

Preferred diols are compounds of the formula VIII

HO—R—OH   (VIII)

wherein R is an aliphatic, cycloaliphatic or aromatic moiety of 2 to 18 carbon atoms.

Preferably such diols are for example ethylene glycol, diethylene glycol, triethylene glycol, propane-1,3-diol, propane-1,2-diol, butane-1,4-diol, pentane-1,5-diol, hexane-1,6-diol, 1,4-cyclohexanedimethanol, 3-methylpentane-2,4-diol, 2-methylpentane-1,4-diol, 2,2-diethylpropane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane and mixtures thereof.

Most preferably, the diol is ethylene glycol or 1,4-cyclohexanedimethanol.

Instead of, or in addition to the diacids mentioned above, various diesters may be used. For example, diesters that correspond in respect of their acid moiety to the aforementioned diacids may be used. Suitable diesters therefore also include the aliphatic and the aromatic kind. Very suitable diesters are for example the $C_1$-$C_4$alkyl esters of terephthalic acid, isophthalic acid, o-phthalic acid or naphthalene dicarboxylic acid.

Preferably, the esterification and transesterification processes are carried out in the presence of a catalyst.

Catalysts of interest for the esterification process are for example antimony or germanium compounds, e.g. antimony (III)oxide ($Sb_2O_3$) or germanium dioxide ($GeO_2$). Of interest are also titanium catalysts as disclosed for example in DE-A-19 513 056 or titanium based catalysts in combination with cobalt and phosphorous based compounds as disclosed for example in DE-A-19 518 943.

Catalysts of interest for the transesterification process are for example titanium compounds, e.g. titanium(IV)butoxide.

The catalysts are preferably used in the preparation of polyesters in an amount of 0.005 to 0.035% by weight of the total amount of reactants.

Polyesters may be produced in a conventional batch process, wherein the product of the transesterification or esterification is formed in one vessel and then transferred to a second vessel for polymerization. The second vessel is agitated and the polymerization reaction is continued until the power used by the agitator reaches a level indicating that the polyester melt has achieved the desired intrinsic viscosity and therefore, the desired molecular weight. For example, in the preparation of polyethylene terephthalate (PET), the esterification or transesterification is typically conducted at an elevated temperature between for example 200 to 350° C. to produce a polyester having an intrinsic viscosity of 0.3 to 0.8 dl/g, commonly about 0.6 to 0.75 dl/g (determined by ASTM D4603-86 at 30° C. in a mixture of 60% by weight of phenol and 40% by weight of tetrachloroethane).

Alternatively, these steps may also be carried out in a continuous process. For example, the continuous process disclosed in WO-A-97/44376 is conducted by combining the diol with the diacid or diester at a temperature of about 240 to 290° C. and at a pressure of from about 30 to 600 kPa for about 1 to 5 hours to yield low molecular weight oligomers and water. In general, a continuous feed of reactants is used employing a molar ratio of diol to diacid or diester of from about 1.0 to 1.6. The water or alcohol so produced is removed as the reaction proceeds.

In the second stage of the continuous process, which is a polycondensation stage generally conducted in a series of 2 or more vessels, the oligomers are agitated at a temperature of about 240 to 305° C. for about 1 to 4 hours in the presence of a polymerization catalyst to form the polyester melt.

Typically, the polycondensation reaction begins in a first vessel operated at a pressure range of from about 0 to 10 kPa. Diol produced in the polycondensation is removed from the polyester melt using an applied vacuum. The polyester melt is typically agitated to allow the diol to escape from the polyester melt.

As the polyester melt is fed into successive vessels, the molecular weight and thus the intrinsic viscosity of the polyester melt increases. The temperature of each vessel is generally increased and the pressure decreased to allow greater polymerization in each successive vessel. The final vessel is generally operated at a pressure of from about 0 to 5.5 kPa. Each of the polymerization vessels communicates with a flash vessel. The retention time in the polymerization vessels and the feed ratio of the reactants into the continuous process are determined in part based on the target molecular weight of the polyester.

The polymerization catalyst employed in the continuous process is generally added prior to, at the start of, or during the polymerization stage.

When the polymerization process is completed, the resulting polyester, which is still in the form of a melt, is generally filtered and the typically extruded and pelletized before being worked up into specific polyester articles or injection molded in a preform or coating into an item such as a bottle. Such steps are also typically labeled as "polyester processing" but refer of course to later working of the finished polyester rather than to the chemical processing steps used to form the polyester in the first place.

For example, polyester melt may be extruded into polyester sheets, filaments, pellets, chips or similar particles (so-called primary extrusion step). Preferably, the polyester melt is extruded shortly or immediately after exiting the polycondensation stage, whereupon it is quenched, for example in a water trough or alternative cooling unit. The formation of pellets or chips is particularly convenient for storage, transport and handling purposes.

The pellets of chips may be subjected to solid state polymerization (SSP), for example, to raise the intrinsic viscosity to 0.7 to 1.2 dl/g, preferably to about 0.83 dl/g.

In order to produce the final polyester articles, in the form of bottles, filaments, sheets, molded articles and the like, the pellets or chips are re-melted and re-extruded or injection molded. The extrusion and injection molding conditions are conventional. For example, the polyester may be extruded at a temperature in the range of 240 to 315° C.

A preferred polyhydric alcohol of the formula I is, for example starch, cellulose, a sugar or a sugar alcohol, especially cellulose or starch.

An especially preferred polyhydric alcohol of the formula I is poly(ethylene-co-vinyl alcohol), poly(styrene-co-allyl alcohol), sorbitol, isomalt, xylitol, sucrose, mucic acid dibutylester, mucic acid di(phenyl-1-ethyl)ester, pentaerythritol, maltose, maltitol, maltopentaose hydrate, maltoheptaose, maltotetraose, maltulose monohydrate, D,L-glucose, dextrose, D-mannitol, trimethylol propane, triethylol propane or glycerol.

Preferred compounds of the formula II are those in which $R_1$ is hydrogen, $C_1$-$C_{12}$alkyl, phenyl, biphenyl, naphthyl, —$CH_2$—O—$C_1$-$C_{12}$alkyl or —$CH_2$—S—$C_1$-$C_{12}$alkyl, and $R_2$ is $C_1$-$C_{12}$alkyl, phenyl, biphenyl, naphthyl, —$CH_2$—O—$C_1$-$C_{12}$alkyl or —$CH_2$—S—$C_1$-$C_{12}$alkyl.

Of special interest are compounds of the formula II wherein $R_1$ and $R_2$ are $C_4$-$C_{12}$alkyl.

The preferred radicals $R'_1$ and $R'_2$ are identical to the preferred radicals $R_1$ and $R_2$.

An especially preferred component (c) is for example a compound of the formula H1, H2, H3, H4, H5, H6, H7, H8, H9, H10, H11, H12, H13, H14 or H15

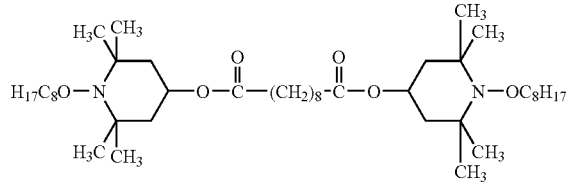
(H1)

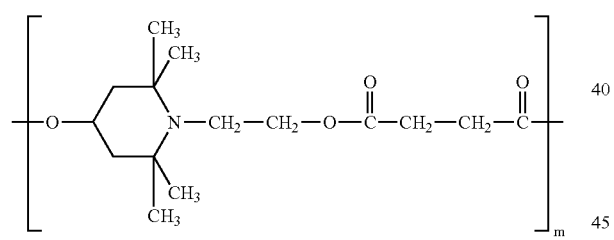
(H2)

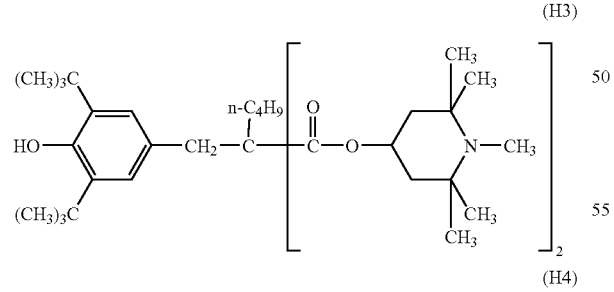
(H3)

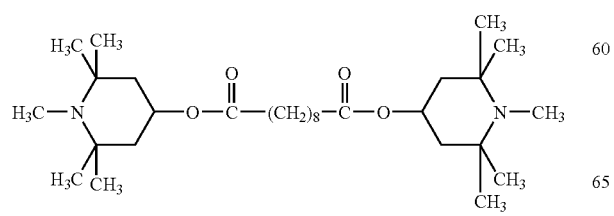
(H4)

-continued

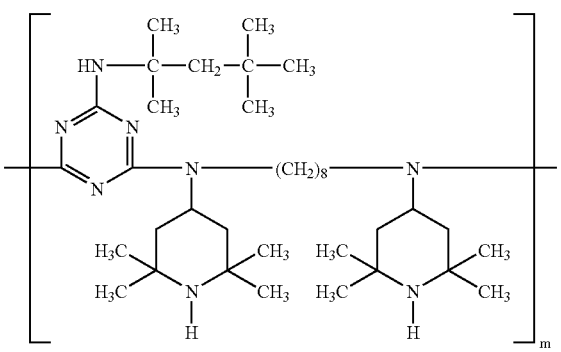
(H5)

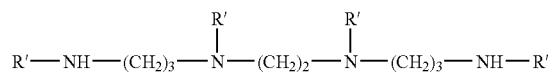
(H6)

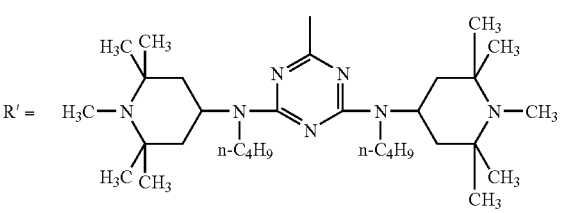
(H7)

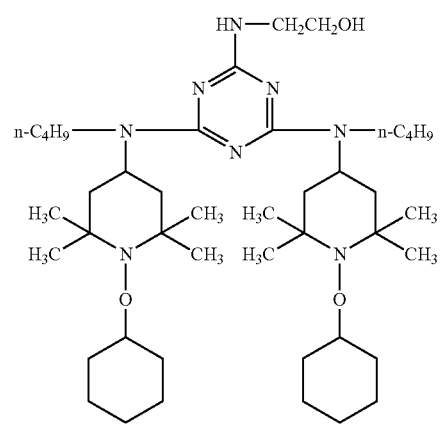

in which m is a number from the range from 2 to 200,

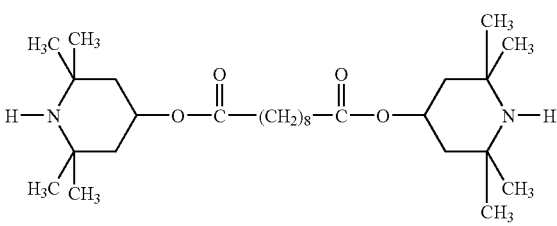
(H8)

-continued

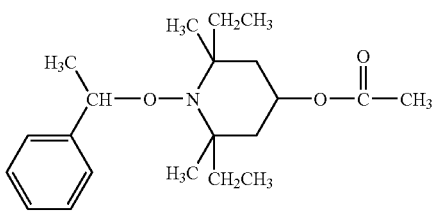 (H9)

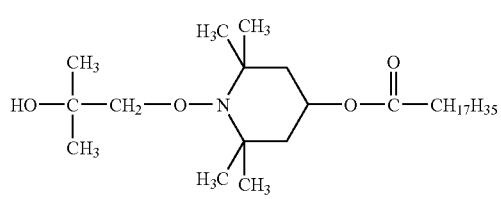 (H10)

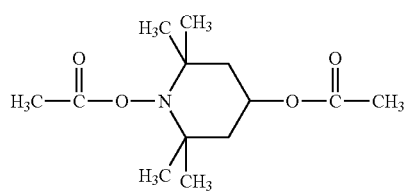 (H11)

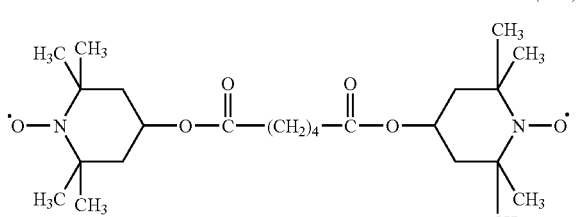 (H12)

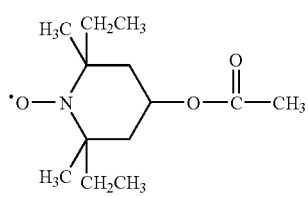 (H13)

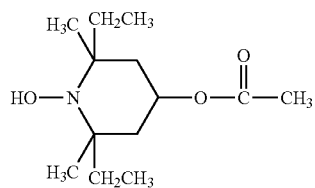 (H14)

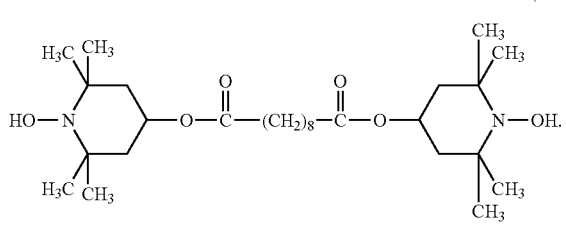 (H15)

Preferred hydroxylamines of component (e) are compounds of the formula IX

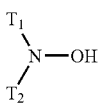 (IX)

wherein $T_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms; and $T_2$ is hydrogen, or independently has the same meaning as $T_1$.

In the present invention the compounds of component (e) are, for example, N,N-dihydrocarbylhydroxylamines of the formula IX wherein $T_1$ and $T_2$ are independently benzyl, methyl, ethyl, octyl, lauryl, dodecyl, tetradecyl, hexadecyl, heptadecyl or octadecyl, or wherein $T_1$ and $T_2$ are each the alkyl mixture found in hydrogenated tallow amine.

The compounds of component (e) in the present compositions and methods are, e.g. N,N-dihydrocarbylhydroxylamines selected from the group consisting of N,N-dibenzylhydroxylamine, N,N-diethylhydroxylamine, N,N-dioctylhydroxylamine, N,N-dilaurylhydroxylamine, N,N-didodecylhydroxylamine, N,N-ditetradecylhydroxylamine, N,N-dihexadecylhydroxylamine, N,N-dioctadecylhydroxylamine, N-hexadecyl-N-tetradecylhydroxylamine, N-hexadecyl-N-heptadecylhydroxylamine, N-hexadecyl-N-octadecylhydroxylamine, N-heptadecyl-N-octadecylhydroxylamine, N-methyl-N-octadecylhydroxylamine and N,N-di(hydrogenated tallow) hydroxylamine.

Component (e) in the present invention may be for example the N,N-di(alkyl)hydroxylamine produced by the direct oxidation of N,N-di(hydrogenated tallow)amine [Irgastab FS-042 (RTM), Ciba Specialty Chemicals Corp.].

The hydroxylamines are for example those disclosed in U.S. Pat. No. 4,590,231 or U.S. Pat. No. 4,612,393.

Preferred nitrones of component (e) are compounds of the formula X

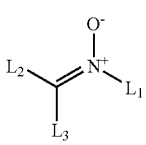 (X)

wherein $L_1$ is straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms; and $L_2$ and $L_3$ are independently hydrogen, straight or branched chain alkyl of 1 to 36 carbon atoms, cycloalkyl of 5 to 12 carbon atoms, aralkyl of 7 to 9 carbon atoms, or said aralkyl substituted by one or two alkyl of 1 to 12 carbon atoms or by one or two halogen atoms; or $L_1$ and $L_2$ together form a five- or six-membered ring including the nitrogen atom.

The nitrones of component (e) may be the corresponding oxidation products of the hydroxylamines. That is to say, the nitrones of component (e) may be nitrone analogues of the hydroxylamines. The nitrones may be for example, N-benzyl-α-phenylnitrone, N-ethyl-α-methylnitrone, N-octyl-α-heptylnitrone, N-lauryl-α-undecylnitrone, N-tetradecyl-α-tridcylnitrone, N-hexadecyl-α-pentadecylnitrone, N-octadecyl-α-heptadecylnitrone, N-hexadecyl-α-heptadecylnitrone, N-ocatadecyl-α-pentadecylnitrone, N-heptadecyl-α-heptadecylnitrone, N-octadecyl-α-hexadecylnitrone, N-methyl-α-heptadecylnitrone the nitrone derived from N,N-di(hydrogenated tallow)hydroxylamine or the compound of the formula N1

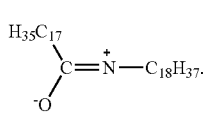

(N1)

The nitrones of component (e) may be for example as described in U.S. Pat. No. 4,898,901.

Of special interest is a process for the preparation of a stabilized polyester that is low in the generation of aldehydes wherein the diacid is terephthalic acid or isophthalic acid; the diester is a $C_1$-$C_4$alkyl ester of terephthalic acid or isophthalic acid; the diol is ethylene glycol; component (a) is poly(ethylene-co-vinyl alcohol), poly(styrene-co-allyl alcohol), maltitol, isomalt, sorbitol, xylitol, sucrose, mucic acid dibutylester, mucic acid di(phenyl-1-ethyl)ester, pentaerythritol or dipentaerythritol; component (b) is di-iso-octyl-phosphinic acid; component (c) is a compound of the formula H1, H2, H3, H4, H5, H6, H7, H8, H9, H10, H11, H12, H13, H14 or H15 according to claim 13; component (d) is polyacrylanilide, an anionic acrylic polymer or a cationic acrylamide copolymer; and component (e) is N,N-dioctadecylhydroxylamine or a compound of the formula N1

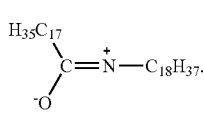

(N1)

A preferred embodiment of the present invention is the use of a stabilizer selected from the group consisting of components (a), (b), (c), (d) or (e) for the preparation of polyesters that are low in the generation of aldehydes during melt processing of the polyesters.

Likewise, the instant invention pertains to a polyester obtainable by the process of the instant invention; and to mineral water bottles, films, trays, containers, baby toys and automobile wind shields prepared from a polyester obtained by the process of the instant invention.

The instant invention also pertains to a process for forming a bottle preform or a PET bottle or container suitable for storing water (mineral, natural, ozonated) or other foodstuffs, which allows the desirable taste of the water or foodstuff after packaging to remain unaltered after being placed in said bottle or container prepared from the polyester of the instant invention.

The following examples are for illustrative purposes only and are not to be construed to limit the scope of the instant invention in any manner whatsoever.

Analytical Procedures:

Intrinsic Viscosity (I.V.): 1 g of polymer is dissolved in 100 g of a 1:1 mixture of phenol and dichlorobenzene. The viscosity of this solution is measured at 30° C. in an Ubelode-Viscosimeter and recalculated to the instrinsic viscosity.

Acetaldehyde Analysis: The concentration of acetaldehyde in PET is quantitatively determined using a thermal desorption GC-MS method adapted from B. Nijassen et al., Packaging Technology and Science, 9, 175 (1996); S. Yong Lee, SPE ANTEC 1997, pp 857-861; and M. Dong et al., J. Chromatographic Science, 18, 242 (1980). A general example follows below:

The PET samples are analyzed, in duplicate, by weighing 250 mg of powdered PET pellets (cryogenically pulverized) in a 5 ml crimp sealed headspace vial. The sample vial is heated at 120° C. for one hour in a Tekmar model 5000 static headspace analyzer. The headspace gas (5 cc) is then transferred via a heated transfer line to a Fisons MD-800 GC-MS system for SIR detection of the acetaldehyde. The acetaldehyde is detected by monitoring its fragment ions of 29 and 44 m/e. The Total Ion Current (TIC) of the GC-MS is also monitored in the retention time region of 4-8 minutes. The presence of acetaldehyde in the samples is confirmed by three different detectors. By using a known acetaldehyde value for PET, the ration of peak areas for the known PET resin and for the experimental PET resins are compared and the amount of acetaldehyde in the experimental PET can be obtained. Alternatively a commercially available standard of acetaldehyde in water (approx. 1 ppm) may be used to establish calibration of the GC-MS.

EXAMPLE 1

Preparation of Polyethylene Terephthalate 1621.3 g of ethylene glycol, 3338.5 g of terephthalic acid, 66.8 g of isophthalic acid, 1.36 g of antimony trioxide are mixed within a metal container with a stabilizer in an amount as indicated in Table 1. The mixture is transferred into a 10 liter reactor (stainless steel) fitted with stirrer, refluxing unit and an outlet-die at the bottom of the reactor. The reactor is pressurized with nitrogen up to 6 bars. The monomer mixture is heated from room temperature to 250° C. within 30 minutes. A water/ethylene glycol mixture is distilled off for 3.5 hours. The temperature is increased consecutively to 280° C. Within the next 5 hours the pressure is continuously reduced to further distill off water and ethylene glycol. Then polyester product is extruded through the bottom die, cooled to room temperature in a water bath and pelletized to yield clear polyethylene terephthalate (PET) granules. From these granules the acetaldehyde content in ppm [Total Ion Current method (TIC)] and the Intrinsic Viscosity (I.V.) in dl/g was measured. The results are summarized in Table 1.

TABLE 1

| Example | Stabilizer [weight %] | Acetaldehyde content in ppm after polycondensation | I.V. [dl/g] | Acetaldehyde content in ppm after extrusion |
|---|---|---|---|---|
| 1a[a)] | none | 170 | 0.75 | 5.0 |
| 1b[b)] | 0.20% compound 101[c)] | 40 | 0.50 | 1.6 |
| 1c[b)] | 0.09% compound 101[c)] | 76 | 0.68 | |
| 1d[b)] | 0.05% compound 101[c)] | 62 | 0.65 | 2.8 |
| 1e[b)] | 0.10% compound 102[d)] | 72 | 0.73 | |
| 1f[b)] | 0.10% compound 103[e)] | 49 | 0.70 | |
| 1g[b)] | 0.10% compound 104[f)] | 58 | 0.57 | |
| 1h[b)] | 0.10% compound 105[g)] | 82 | 0.70 | |
| 1i[b)] | 0.10% compound 106[h)] | 94 | 0.68 | |
| 1j[b)] | 0.10% compound 107[i)] | 78 | 0.64 | |
| 1k[b)] | 0.10% compound 108[j)] | 62 | 0.72 | |
| 1l[b)] | 0.10% compound 109[k)] | 78 | 0.64 | 3.9 |
| 1m[b)] | 0.10% compound 110[l)] | 97 | 0.69 | |

TABLE 1-continued

| Example | Stabilizer [weight %] | Acetaldehyde content in ppm after polycondensation | I.V. [dl/g] | Acetaldehyde content in ppm after extrusion |
|---|---|---|---|---|
| | 0.25% compound 111[m] | | | |
| 1n[b] | 0.10% compound 112[n] | 99 | 0.70 | |
| 1o[b] | 0.05% compound 113[o] | 58 | 0.68 | 2.3 |
| 1p[b] | 0.05% compound 114[p] | 57 | 0.69 | |
| 1q[b] | 0.10% compound 115[q] | 52 | 0.71 | 3.8 |
| 1r[b] | 0.10% compound 116[r] | 56 | 0.30 | |
| 1s[b] | 0.05% compound 117[s] | 53 | 0.67 | |
| 1t[b] | 0.05% compound 118[t] | 78 | 0.70 | |
| 1u[b] | 0.10% compound 119[u] | 41 | 0.59 | |
| 1v[b] | 0.10% compound 120[v] | 29 | 0.48 | |
| 1w[b] | 0.10% compound 121[w] | 46 | 0.62 | |
| 1x[b] | 0.10% compound 122[x] | 37 | 0.65 | |
| 1y[b] | 0.10% compound 123[y] | 54 | 0.62 | |
| 1z[b] | 0.10% compound 124[z] | 71 | 0.65 | |
| 1aa[b] | 0.10% compound 125[aa] | 34 | 0.52 | |
| 1ab[b] | 0.10% compound 126[ab] | 72 | 0.69 | |
| 1ac[b] | 0.10% compound 127[ac] | 52 | 0.58 | |
| 1ad[b] | 0.10% compound 128[ad] | 36 | 0.61 | |
| 1ae[b] | 0.10% compound 130[ae] | 77 | 0.71 | |
| 1af[b] | 0.05% compound 130[af] | 68 | 0.73 | |

[a] Example for comparison.
[b] Example according to the invention.
[c] Compound 101 is poly(ethylene-co-vinyl alcohol) [63 mole % vinyl alcohol, 27 mole % ethylene, melt flow rate (210° C./2.16 kg) of 3.9 g/10 minutes].
[d] Compound 102 is poly(styrene-co-allyl alcohol) [60 mole % styrene, 40 mole % allyl alcohol, molecular weight 2000 g/mole].
[e] Compound 103 is maltitol.
[f] Compound 104 is isomalt [a mixture of 43% O-α-D-glucopyranosyl-D-sorbitol (GPS) and 57% O-α-D-glucopyranosyl-D-mannitol-dihydrate (GPM)].
[g] Compound 105 is sorbitol.
[h] Compound 106 is xylitol.
[i] Compound 107 is sucrose.
[j] Compound 108 is mucic acid dibutylester.
[k] Compound 109 is mucic acid di(phenyl-1-ethyl)ester.
[l] Compound 110 is pentaerythritol.
[m] Compound 111 is calcium bis(ethyl 3,5-di-tert-butyl-4-hydroxybenzyl-phosphonate) of the formula P-1

(P1)

[n] Compound 112 is di-iso-octyl-phosphinic acid.
[o] Compound 113 is Tinuvin 123 (RTM) (Ciba Specialty Chemicals Inc.) of the formula H1

(H1)

[p] Compound 114 is Tinuvin 622 (RTM) (Ciba Specialty Chemicals Inc.) of the formula H2

(H2)

in which m is a number from the range from 2 to 200.
[q] Compound 115 is polyacrylanilide with a number average molecular weight Mn: 10600 g/mol; weight average molecular weight Mw: 45000 g/mol measured by GPC, eluent and solvent is tetrahydrofurane; internal standard is cyclohexane.
[r] Compound 116 is dipentaerythritol.
[s] Compound 117 is Tinuvin 765 (RTM) (Ciba Specialty Chemicals Inc.) of the formula H4

(H4)

[t] Compound 118 is Tinuvin 770 (RTM) (Ciba Specialty Chemicals Inc.) of the formula H8

(H8)

[u] Compound 119 is a compound of the formula H9

(H9)

[v] Compound 120 is a compound of the formula H10

(H10)

[w] Compound 121 is a compound of the formula H11

TABLE 1-continued

| Example | Stabilizer [weight %] | Acetaldehyde content in ppm after polycondensation | I.V. [dl/g] | Acetaldehyde content in ppm after extrusion |
|---|---|---|---|---|

(H11)

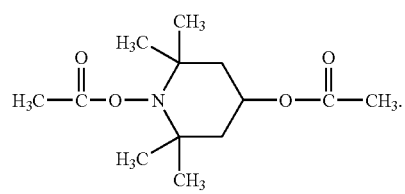

$^{x)}$Compound 122 is a compound of the formula H12

(H12)

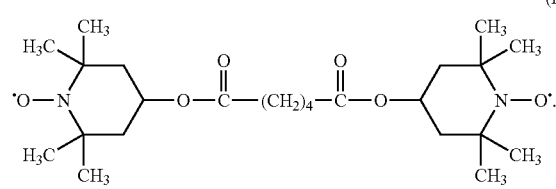

$^{y)}$Compound 123 is a compound of the formula H13

(H13)

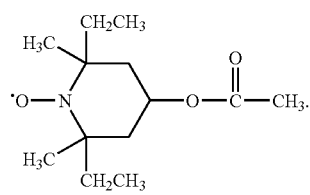

$^{z)}$Compound 124 is a compound of the formula H14

(H14)

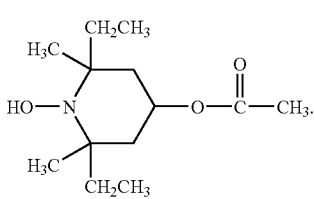

$^{aa)}$Compound 125 is a compound of the formula H15

(H15)

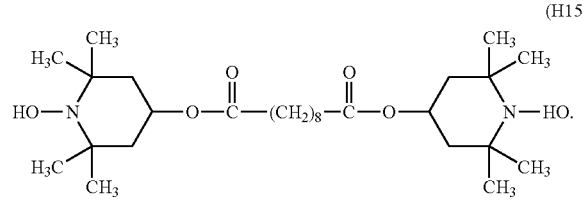

$^{ab)}$Compound 126 is Magnafloc 611 (RTM) (Ciba Specialty Chemicals Inc.), an anionic acrylic polymer, sold as flocculant.
$^{ac)}$Compound 127 is Zetag 7633 (RTM) (Ciba Specialty Chemicals Inc.), a cationic acryl-amide copolymer, sold as sewage and industrial sludge flocculant.
$^{ad)}$Compound 128 is Magnafloc 139 (RTM) (Ciba Specialty Chemicals Inc.), a weak anionic acrylic polymer with low molecular weight, sold as flocculant.
$^{ae)}$Compound 129 is a compound of the formula N1 (nitrone)

TABLE 1-continued

| Example | Stabilizer [weight %] | Acetaldehyde content in ppm after polycondensation | I.V. [dl/g] | Acetaldehyde content in ppm after extrusion |
|---|---|---|---|---|

(N1)

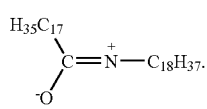

$^{af)}$Compound 130 is N,N-dioctadecylhydroxylamine.

The polycondensation in the melt as described above is followed by a solid state polycondensation (SSP) for further increasing the molecular weight by monitoring the instrinsic viscosity. Furthermore, this process decreases the content of acetaldehyde.

The following description illustrates the general technical procedure: 2.5 kg of polyethylene terephthalate according to Examples 1a is placed at room temperature into a vacuum tumbling dryer. During continuous tumbling of the polyethylene terephthalate under a vacuum of 0.06 mbar the following temperature protocol is followed: a) 1 hour at 120° C., b) 1 hour at 160° C., c) 1 hour at 190° C., and d) 5 hours at 220° C. The obtained product revealed an intrinsic viscosity value of 0.82 dl/g and a content of acetaldehyde of 0.85 ppm. Additionally all polyethylene terephthalate samples according to Examples 1b-1q were treated similar under solid state polycondensation condition. The target intrinsic viscosity value of 0.80+/−0.02 is achieved by adjusting the solid state polycondensation processing conditions like for example time and temperature. The content of acetaldehyde after solid state polycondensation of Examples 1b-1q is proven to be below 1 ppm in all samples.

Examples 1a, 1b, 1d, 1l, 1o and 1q which were treated under solid state polycondensation condition were additionally melt extruded in a Leistritz 18 mm co-rotating, intermeshing twin screw extruder at a temperature range of 280-284° C. From these extruded polyethylene terephthalate samples the content of acetaldehyde is measured. The results which are summarized in the last column of Table 1 clearly reveal that a significant reduction of the rebuilding of acetaldehyde during extrusion is observed in Examples 1b, 1d, 1l, 1o and 1q according to the invention which contain a stabilizer in comparison to Example 1a which does not contain a stabilizer.

What is claimed is:
1. A process for the preparation of a stabilized polyester that is low in the generation of aldehydes which comprises reacting one or more diacids with one or more diols in an esterification process, and/or one or more diesters with one or more diols in a transesterification process in the presence of an effective amount of a stabilizer selected from the group consisting of

(c) a sterically hindered amine which comprises at least a radical of the formula IV or V

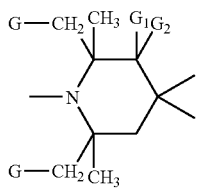

(IV)

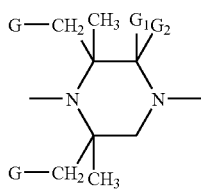

(V)

wherein
G is hydrogen or methyl, and
$G_1$ and $G_2$ are hydrogen, methyl or together are oxygen.

2. A process according to claim 1, comprising in addition to components (c) the further presence of at least one sterically hindered hydroxyphenylalkylphosphonic ester or monoester.

3. A process according to claim 2, wherein the sterically hindered hydroxyphenylalkylphosphonic ester or monoester is a compound of the formula VII

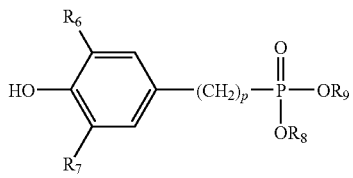

(VII)

wherein
$R_6$ is isopropyl, tert-butyl, cyclohexyl or cyclohexyl which is substituted by 1-3 $C_1$-$C_4$alkyl groups,
$R_7$ is hydrogen, $C_1$-$C_4$alkyl, cyclohexyl or cyclohexyl which is substituted by 1-3 $C_1$-$C_4$alkyl groups,
$R_8$ is $C_1$-$C_{20}$alkyl, unsubstituted or $C_1$-$C_4$alkyl-substituted phenyl or naphthyl,
$R_9$ is hydrogen, $C_1$-$C_{20}$alkyl, unsubstituted or $C_1$-$C_4$alkyl-substituted phenyl or naphthyl; or is $$\frac{M^{r+}}{r};$$

$M^{r+}$ is an r-valent metal cation,
p is 1, 2, 3, 4, 5 or 6, and
r is 1, 2 or 3.

4. A process according to claim 2, wherein the sterically hindered hydroxyphenylalkylphosphonic ester or monoester is a compound of the formula P1 or P2

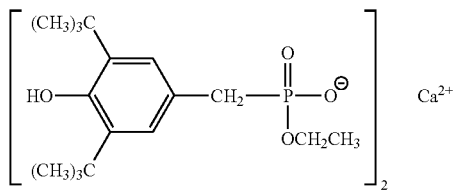

(P1)

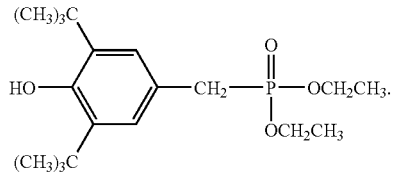

(P2)

5. A process according to claim 1, wherein the diacid is selected from the group consisting of aromatic dicarboxylic acids having 8 to 14 carbon atoms, aliphatic dicarboxylic acids having 4 to 12carbon atoms, cycloaliphatic dicarboxylic acids having 8 to 12 carbon atoms, and mixtures thereof.

6. A process according to claim 1, wherein the diacid is terephthalic acid, isophthalic acid, o-phthalic acid, naphthalene dicarboxylic acid, cyclohexane dicarboxylic acid, cyclohexanediacetic acid, diphenyl-4,4'-dicarboxylic acid, succinic acid, glutaric acid, adipic acid, sebacic acid and mixtures thereof.

7. A process according to claim 1 wherein the diacid is terephthalic acid or 2,6-naphthalene dicarboxylic acid.

8. A process according to claim 1 wherein the diol is a compound of the formula VIII $$HO-R-OH \quad (VIII)$$

wherein R is an aliphatic, cycloaliphatic or aromatic moiety of 2 to 18 carbon atoms.

9. A process according to claim 1 wherein the diol is selected from the group consisting of ethylene glycol, diethylene glycol, triethylene glycol, propane-1,3-diol, butane-1,4-diol, pentane-1,5-diol, hexane-1,6-diol, 1,4-cyclohexanedimethanol, 3-methylpentane-2,4-diol, 2-methylpentane-1,4-diol, 2,2-diethylpropane-1,3-diol, 1,4-di-(hydroxyethoxy)benzene, 2,2-bis(4-hydroxycyclohexyl)-propane, 2,4-dihydroxy-1,1,3,3-tetramethylcyclobutane, 2,2-bis-(3-hydroxyethoxyphenyl)propane, 2,2-bis-(4-hydroxypropoxyphenyl)ethane and mixtures thereof.

10. A process according to claim 1 wherein component (c) is a compound of the formula H1, H2, H3, H4, H5, H6, H7, H8, H9, H10, H11, H12, H13, H14 or H15

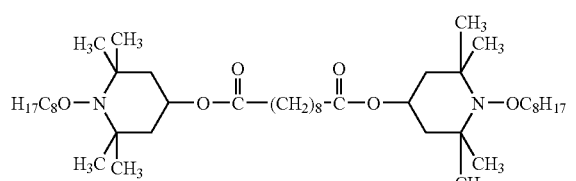

(H1)

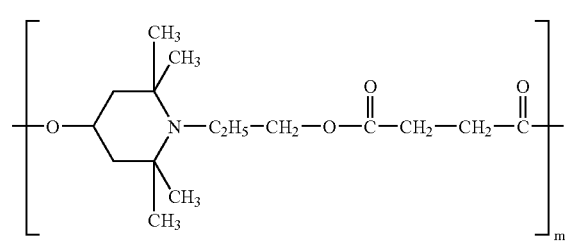

(H2)

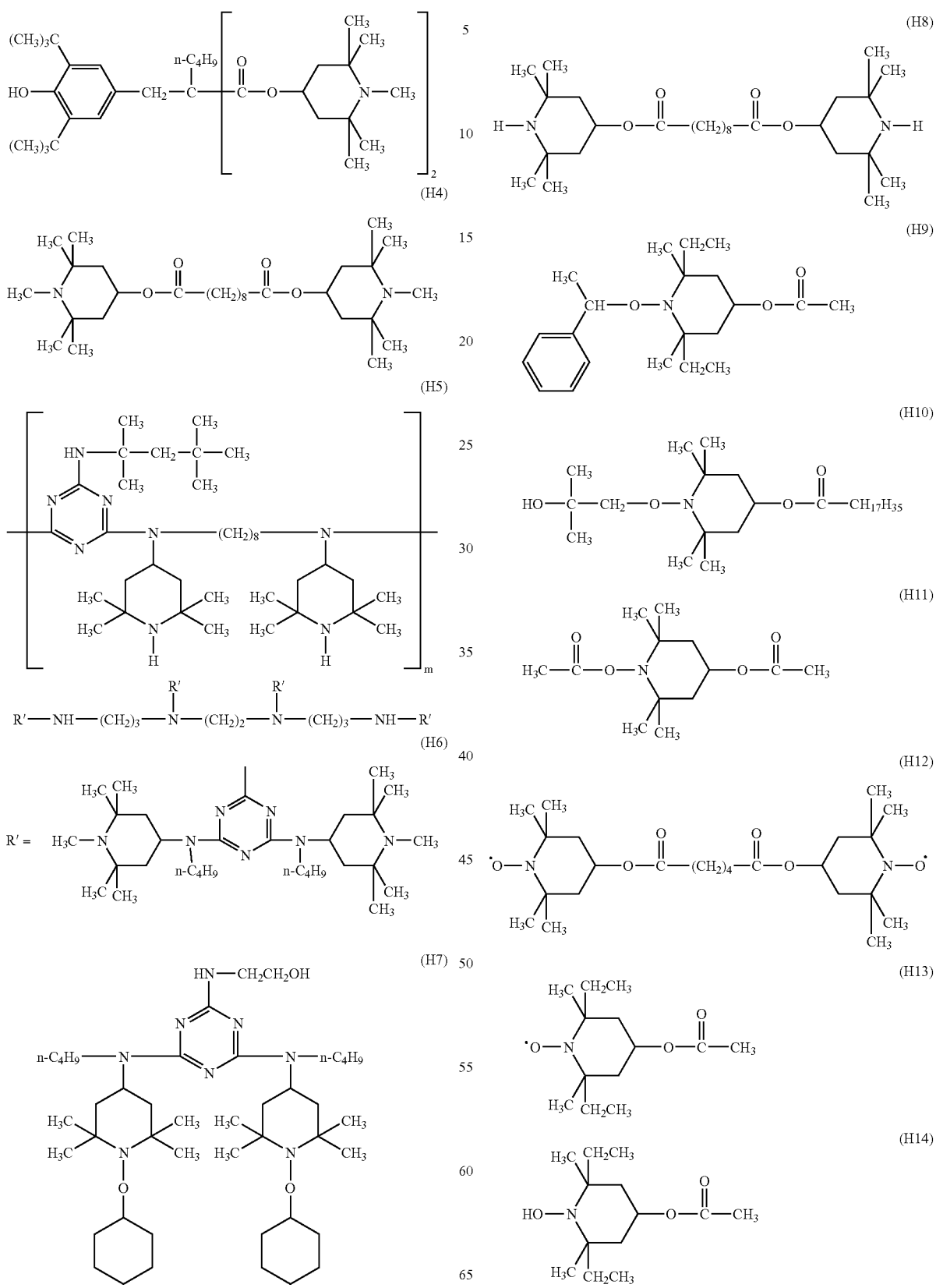
in which
m is a number from the range from 2 to 200,

-continued
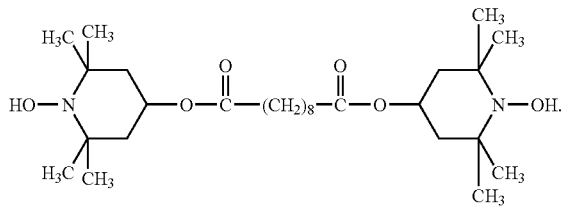
(H15)
11. A process according to claim 10 wherein the diacid is terephthalic acid or isophthalic acid; the diester is a $C_1$-$C_4$alkyl ester of terephthalic acid or isophthalic acid; the diol is ethylene glycol; component (c) is a compound of the formula H1, H2, H3, H4, H5, H6, H7, H8, H9, H10, H11, H12, H13, H14 or H15.
* * * * *